United States Patent

Troutman

[11] 3,711,946
[45] Jan. 23, 1973

[54] TRIMMING APPARATUS
[76] Inventor: Glenn R. Troutman, 684 Valemont Drive, Penn Hills Twp., Allegheny County, Pa. 15147
[22] Filed: April 12, 1971
[21] Appl. No.: 133,133

[52] U.S. Cl..................................30/388, 30/276
[51] Int. Cl..........................B23d 49/00, B26b 7/00
[58] Field of Search.........30/167, 240, 264, 265, 276

[56] References Cited

UNITED STATES PATENTS

| | | | |
|---|---|---|---|
| 2,286,043 | 6/1942 | Welch | 30/167 |
| 964,865 | 7/1910 | Jackson | 30/276 |
| 844,414 | 2/1907 | Seabloom | 30/167 |
| 3,192,625 | 7/1965 | McJohnson | 30/276 |
| 2,722,095 | 11/1955 | Farney | 30/264 |

*Primary Examiner*—James L. Jones, Jr.
*Attorney*—Buell, Blenko & Ziesenheim

[57] ABSTRACT

Trimming apparatus for prunning hedges and the like wherein at least one circular disc having teeth round its periphery is positioned adjacent a plate member and preferably between parallel, spaced apart plate members having first teeth along edge portions thereof. Said second teeth are positioned to at least partially overlap said first teeth as said circular discs are rotated by a drive means. Preferably said first teeth are positioned along opposite, substantially parallel edge portions and said second teeth overlap first teeth along each said parallel edge portion. In addition, a catching means is preferably provided for collecting the trimmings as they are cut and directing them to one side of the apparatus.

5 Claims, 3 Drawing Figures

INVENTOR
Glenn R. Troutman

TRIMMING APPARATUS

My invention relates to trimming apparatus for cutting hedges and the like. It is particularly useful in providing an apparatus of simple and durable construction for trimming hedges better and more rapidly.

Prunning apparatus for trimming hedges and the like is broadly old and well-known. One form, which has been widely manufactured and used, resembled a sickle-bar mower: Blades were positioned adjacently along a stationary bar, and blades were positioned adjacently along a moveable bar. The moveable bar was powered so that it slid reciprocally across the stationary bar to form a scissor-like cutting action between the blades. Such devices were effective for cutting small and newly grown trimmings. But they were limited in that they would jam rather than cut larger and older growth. In addition, such devices required detailed maintenance for continued service.

Another form was similar to a rotary lawn mower: Rotor blades were positioned on the end portion of a moveable arm which in turn was positioned on a moveable frame, or were positioned directly on said moveable frame. The cutting action was achieved by rotating the rotor blades at high speed. One such proposal of this form was shown in U.S. Pat. No. 3,443,005. Such devices were effective in cutting larger and older growth as well as small and new growth. But the apparatus was bulky and dangerous to operate, and in addition, caused frayed rather than clean-cut ends where the trimmings were removed. The latter was detrimental to the appearance and continued healthy growth of the hedge.

The present invention overcomes these disadvantages and difficulties and provides an apparatus of simple and durable construction for trimming hedges better and more rapidly.

I provide trimming apparatus with at least one plate member, and preferably two plate members positioned parallel and spaced from one another. Said plate members have first teeth along edge portions thereof and, where two parallely spaced plate members are used, said first teeth of said plate members preferably coinciding with each other. At least one circular disc rotatably mounted adjacent said plate members and preferably between two said plate members, preferably by a shaft through said plate members and said circular disc. Said circular disc has second teeth round the periphery thereof and positioned to at least partially overlap at least some of said first teeth along said edge portions of said plate members during rotation of said circular disc. And drive means for rotating said circular disc are mounted adjacent said plate members.

In operation, the trimming apparatus is moved along the hedge with the circular discs rotating. The trimmings to be cut encounter said first teeth and are gathered. Preferably, said first teeth are shaped so as to direct the trimmings toward center portions of said circular discs. The second teeth then make a clean cut of the trimmings as said second teeth overlap the first teeth during rotation. In this regard, I prefer, where only one plate member is used, that the second teeth be beveled and the circular disc be positioned closely adjacent the plate member to provide for cleaner cutting of the trimmings. However, I prefer that two plate members be used and the circular disc be positioned between them; in this way, a clean cut is easily made because the trimmings are supported on both sides of the circular disc as they are cut.

I prefer that the plate members be elongated and that a plurality of said circular discs be mounted along said plate members and preferably between them. Additionally I prefer that circular discs adjacently mounted along said plate members be rotated by said drive means in opposite directions.

Said trimming apparatus can be moved along to effect trimming of hedges and the like in any suitable way. If it is a large embodiment, it may be convenient to attach it to a motorized frame with wheels which can be driven along the hedge as it is trimmed. I prefer however that my trimming apparatus be of small scale so that it can be readily moved about and operated by one person by hand. In this connection, I prefer that handle means for moving said trimming apparatus, during operation thereof, be attached adjacent end portions of said plate members, either by direct attachment to said plate member or by indirect attachment through, for example, the housing of a portion of the drive means.

For flexibility and ease of use by either a right-handed or left-handed person, I additionally prefer that said first teeth are positioned along opposite, substantially parallel elongated edge portions of said plate members and said second teeth are positioned to overlap some of said first teeth along both of said elongated edge portions. In this way the trimming apparatus can perform the trimming operation by movement in either direction substantially perpendicular to said elongated edge portions.

Alternatively, or supplementally, I prefer that catching means for collecting trimmings cut by said trimming apparatus and preferably for directing said trimmings to one side of said trimming apparatus are positioned adjacent said plate members. In this way the trimmings cut by the apparatus do not fall into the hedge where they are difficult to remove. They are instead collected in said catching means which can be removed from time to time to dispose of the trimmings in a container, or deposited on the ground to one side of the hedge where they can be easily raked together. Further, I prefer that the catching means be symmetrical so that it can be mounted on either edge portion to accommodate use by both right and left-handed persons of the flexible embodiment described above.

Other details, objects and advantages of my invention will become apparent as the following description of the presently preferred embodiments thereof proceeds.

In the accompanying drawings, I illustrate presently preferred embodiments of my invention in which.

Figure 1:
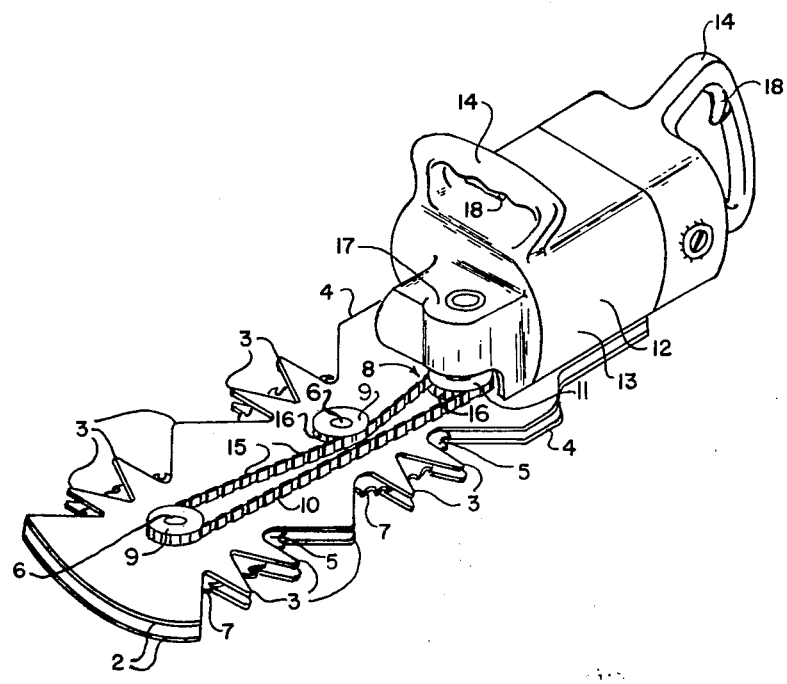
FIG. 1 is a perspective view of a trimming apparatus.

Referring specifically to the drawings, a trimming apparatus has two elongated plate members 2 positioned substantially parallel and spaced from each other. Each plate member 2 has first teeth 3 along opposite substantially parallel edge portions 4, with first teeth 21 coinciding with first teeth of the other plate member 20. Two circular discs 5 are rotatably mounted adjacent and between plate members 2 on shifts 6 which extend through plate members 2. Each circular disc 5 has second teeth 7 round the periphery thereof which are positioned to overlap some of said first teeth 3 along each said elongated edge portion 4. First teeth 3 are shaped so as to direct the trimmings to be cut toward center portions of said circular discs 5.

Drive means 8 are comprised of pulley means 9 rigidly fastened on shafts 6 adjacent and above plate member 2, a belt 10 contacting adjacent pulley means 9 on opposite sides to rotate the adjacent circular discs 5 in opposite directions, drive pulley means 11 for driving belt 10, and a power source 12, such as an electric motor, enclosed in housing 13.

Housing 13 is mounted on plate member 2 and is provided with handling means 14 for operation of the trimming apparatus. For safety reasons, the pulley means 9 and belt 10 may be provided with a shield (not shown).

Preferably the belt 10 has lugs 15 and pulley means 9 and 11 have corresponding lug teeth 16 to provide for more positive drive of the circular discs 5. In this connection, I also prefer that a clutch means 17 be provided in housing 13 so that if the trimming apparatus should jam during use, the power source 12 will not be stalled and in turn damaged.

As a safety feature, I prefer that trigger switching means 18 for turning "off" and "on" power source 12 be provided in both handling means 14. Switching means 18 are biased so that they can be maintained in the "on" position only by exerting force on them. By this arrangement, the power source 12 can be actuated only by holding both switching means 18 in the "on" position and is deactuated if either one or both of the switching means 18 are released.

Figure 2:
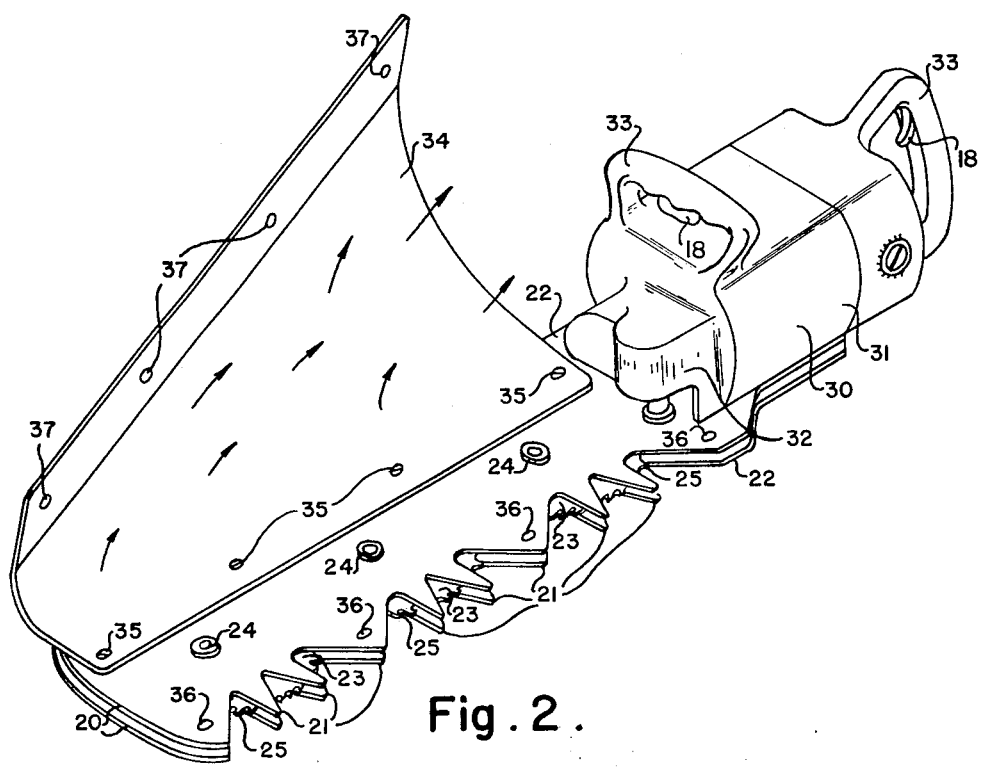
FIG. 2 is a perspective view of an alternative trimming apparatus.
Figure 3:
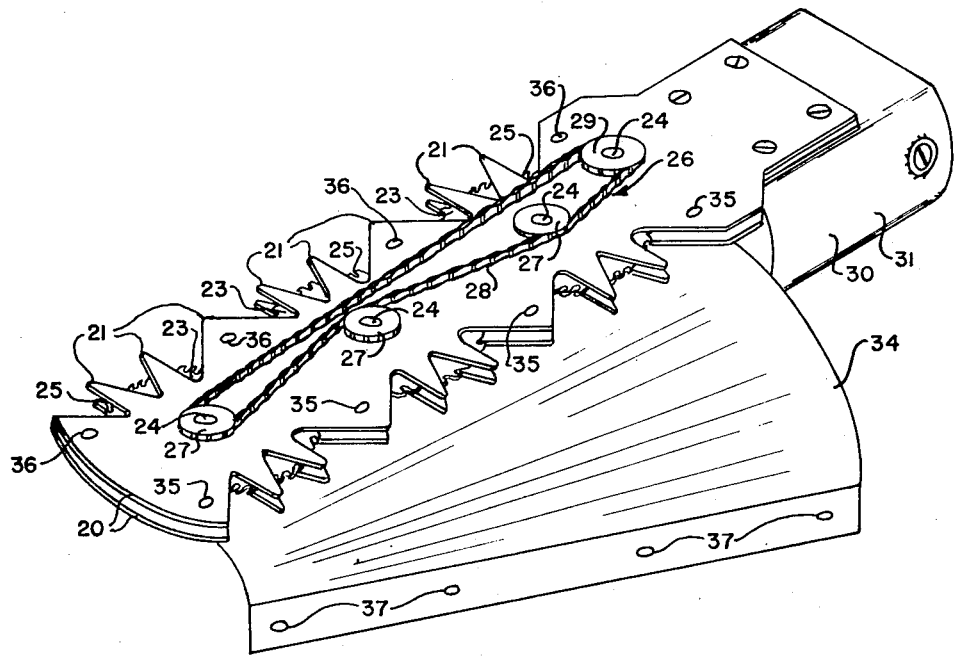
FIG. 3 is a second perspective view of the trimming apparatus shown in FIG. 2.

In an alternative embodiment, (FIG. 2 and 3), a trimming apparatus has two elongated plate members 20 positioned substantially parallel and spaced from each other. Each plate member 20 has first teeth 21 along opposite substantially parallel edge portions 22, with first teeth 21 coinciding with first teeth 21 of the other plate member 20. Three circular discs 23 are rotatably mounted adjacent and between plate members 20 on shafts 24 which extend through plate members 20. Each circular disc 23 has second teeth 25 round the periphery thereof which are positioned to overlap some of said first teeth 21 along each said elongated edge portion 22. First teeth 21 are shaped so as to direct the trimmings to be cut toward center portions of said circular discs 23.

Drive means 26 are comprised of gear means 27 rigidly fastened on shafts 24 adjacent and below plate member 20, a chain 28 contacting adjacent gear means 27 on opposite sides to rotate adjacent circular discs 23 in opposite directions, drive gear 29 for driving said chain 28, and a power source 30, such as an electric motor, enclosed in housing 31. Preferably, also enclosed in housing 31 is clutch means 32 between the power source 30 and the drive gear 29 so that if the trimming apparatus is jammed during operation, the power source 20 will not be stalled and in turn damaged. For safety reasons, the gear means 27 and chain 28 may be provided with a shield (not shown).

Handling means 33 are provided on housing 31 to provide for movement of the trimming apparatus during operation thereof.

Catching means 34 is fastened to the plate member 20 at 35. CAtching means 34 is symmetrical so that it can also be fastened at 36 by holes 37 to accommodate persons who are left-handed. Catching means collect trimmings cut by the trimming apparatus and directs them (as shown by the arrows in FIG. 2) to one side of the trimming apparatus where the trimmings are deposited on the ground to one side of the hedge. There they can be gathered and disposed of.

While I have described certain presently preferred embodiments of and uses of my invention, it is to be distinctly understood that my invention is not limited thereto but that it may be otherwise variously embodied and used.

I claim:

1. A trimming apparatus comprising: a pair of elongated plate members disposed in substantially parallel spaced relation, each plate member having first teeth along opposite edge portions thereof; a plurality of circular discs rotatably mounted between said plate members and having second teeth around the periphery thereof, said second teeth positioned to at least partially overlap at least some of said first teeth along said edge portions during rotation of said circular discs; and drive means for rotating said circular discs mounted adjacent said plate members.

2. A trimming apparatus as claimed in claim 1, wherein handle means for moving said trimming apparatus during operation thereof is attached adjacent end portions of said plate members and carries motor means for said drive means.

3. A trimming apparatus as claimed in claim 1, wherein adjacent circular discs are rotated by said drive means in opposite directions.

4. A trimming apparatus as claimed in claim 1 comprising in addition: catching means secured to one of said plate members for collecting trimmings cut by said trimming apparatus and directing them to one side of said trimming apparatus.

5. A trimming apparatus as claimed in claim 1, wherein said first teeth along corresponding edge portions of said plate members coincide with each other.

* * * * *